United States Patent Office 3,184,814
Patented May 25, 1965

3,184,814
PROCESS OF FORMING A FOUNDRY MOLD WITH AN ACID CURABLE BINDER
Lloyd H. Brown, Crystal Lake, Ill., assignor to The Quaker Oats Company, Chicago, Ill., a corporation of New Jersey
No Drawing. Filed Sept. 12, 1963, Ser. No. 308,361
13 Claims. (Cl. 22—193)

This invention relates to novel foundry sand compositions, and to a process for forming hardened foundry molds and cores from such compositions at room temperature. This application is a continuation-in-part of my copending application Serial No. 58,637, filed September 27, 1960. This application is now abandoned.

The use of shell molds and cores employing sand and a resinous binder is widespread. Normally the sand particles are intimately mixed with a small quantity of thermosetting resin and the resulting mixture formed into a desired shape; the resin is then cured and hardened by heating the shaped mass at elevated temperatures. The resulting mold or core is of adequate hardness to shape molten metals poured thereover. The resinous binder preferably deteriorates at a temperature reached during the metal casting operation, after the metal surface contacting the same is form-retaining, to facilitate removal of cores from cast metal objects. The selection of suitable binders and quantities of the same for forming various metals is believed to be well within the skill of the art.

Quite obviously many advantages would result if the heat treatment necessary for the resin binder polymerization could be eliminated. The ovens or other equipment necessary for heating of the molds could be dispensed with, as well as the attendant initial and operating expenses. The heat problems generated by operation of the heating devices would similarly also be eliminated. In accordance with this invention, conventional sand-blowing machines may be employed for carrying out room-temperature cures of acid-hardenable binders adapted to retain sand particles of a core or mold in desired, shaped configuration.

It is an object of this invention to provide a novel foundry sand composition employing an acid-hardenable, polymerizable binder which is particularly adapted for use with sand blowing machines utilized in the formation of cores and molds.

It is another object of this invention to provide a novel molding composition containing an acid-hardenable, thermosetting, polymerizable binder which may be utilized for purposes of forming cores and molds of good strength at room temperature.

It is another object of this invention to provide a process for rapidly curing a molding composition without raising the temperature of said composition above room temperature.

It is a still further object of this invention to provide a process for rapidly curing a molding composition whereby said composition will be of desired hardness throughout.

It is yet another object of this invention to provide a process for rapidly curing a molding composition without heating the composition above room temperature whereby overcuring and strength deterioration of the surfaces of shaped molding compositions is avoided.

The above and other objects of this invention will become more apparent from the following description and appended claims.

A molding composition made in accordance with the process of this invention may be obtained by mixing together: sand; an aqueous mixture of an acid catalyst adapted to harden the binder; and an acid-hardenable, thermosetting, polymerizable binder. The composition may be shaped into a desired molded configuration by blowing the same from a conventional foundry sand cartridge onto a conventional vented pattern which allows air to pass therethrough.

Air is then blown through the shaped foundry mixture. In the normal course of air passage through the pattern openings and overlying foundry mixture, the water component of the mixture is rapidly evaporated until the acid catalyst becomes of adequate concentration to trigger polymerization of the thermosetting binder. A dense hard shell mold may be completely cured while on the pattern surface. Also, as is more often done, the mold or core may be room cured in a relatively short period of time at room temperature upon removal of the same from the pattern after the acid diluent has been removed from the shaped composition. Such removal of the shaped foundry mixture prior to complete cure allows optimum use to be made of the apparatus employed.

It is apparent from the above process description that the foundry mixture should contain adequate binder so that the sand particles are retained in desired shape, at least until molten metal contacting the same has attained a set shape. Normally, the thermosetting binder should be present in the amount of one to six parts per one hundred parts by weight of the sand to perform the desired binding function.

Suitable binders comprise polymerizable thermosetting materials, such as furfuryl alcohol, and low viscosity polymers thereof, i.e., polymers having a viscosity less than 500 centipoises beyond which uniform distribution of the same on the sand particles is rendered most difficult. Other resinous compositions found satisfactory and which are presented for purposes of illustration and not limitation comprise furfuryl alcohol-formaldehyde resins, furfurylated urea resins, urea-formaldehyde resins, phenol-formaldehyde resins and furfuryl alcohol-phenol-formaldehyde resins.

Suitable catalysts for triggering polymerization of the thermosetting binder include sulfuric acid, phosphoric acid, dodecylbenzene sulfonic acid, maleic acid, trichloroacetic acid and Lewis acids, such as ferric chloride. Any catalyst which provides a "mix" pH of between about 2 and 4.5 will function satisfactorily for purposes of effecting the desired hardening of the thermosetting binder; such acid should be of low volatility. The mix pH is the pH of a slurry of ten grams of the uncured foundry sand mix in 50 cc. of neutral distilled water.

The specific quantity of acid catalyst to be employed in any foundry composition cannot be set forth with particularity since the necessary quantity of acid for triggering polymerization of the binder is dependent upon a number of variables, including the specific thermosetting binder employed and the alkaline values contained in the specific sand employed. The aqueous acid solution employed in the process of this invention must be employed in the foundry sand mixtures so as to contain acid in sufficient amount, but insufficient initial concentration to effect polymerization of the thermosetting binder. Similarly, the quantity of binder necessarily employed in foundry compositions of the type under consideration cannot be set forth with exactness. Obviously the quantity of binder to be employed is dependent upon the sand fineness since finer sands will require more binder to retain the grains together than an equal volume of coarser sand. The determination of the optimum amount of the various ingredients for carrying out this invention is believed to be well within the skill of the ordinary workman after the principles of the provided process are understood.

The usual sequence of steps employed in forming the foundry composition of this invention comprises mixing the aqueous acid catalyst with the sand, after which the thermo-setting polymerizable binder is added and a homogeneous mixture formed. The water present in the mixture renders the acid catalyst sufficiently dilute so that polymerization of the binder cannot be triggered.

Thus, to initiate polymerization of the binder, sufficient water must be removed from the molding composition to render the acid catalyst sufficiently concentrated. The water may be removed by blowing air, or other gas inert to the composition ingredients, through the molding composition after it is formed in place on a vented pattern, or in a vented core box.

As an alternate method of removing the acid diluent, the molding composition and mold for shaping the same may be placed under vacuum for purposes of removing the necessary amount of catalyst diluent which will result in triggering of the binder polymerization.

It has been found that the air or other gases inert to the foundry mixture components may be heated, and initial passage therethrough in the course of the evaporation of the aqueous diluent of the catalyst will not raise the temperature of the mixture itself. The heat content of the gases is initially expended in supplying heat of vaporization for vaporizing the aqueous diluent and may in fact cause a cooling effect and lowering in temperature of the foundry composition at the start of the gas passage through the composition.

Accordingly, a heated air stream may be passed through the shaped foundry composition until the aqueous diluent for the acid catalyst has been substantially removed. Passage of the gas stream may then be stopped and the shaped foundry composition, which may be normally removed at this stage from the mold or pattern surface without danger of breaking, is allowed to finish curing at room temperature in about two or three hours. Subjoined Table I illustrates the initial constant temperature of a shaped foundry sand composition when an air stream heated to 66° C. is employed, and the initial reduction in composition temperature when an air stream heated to 86° C. is employed.

The foundry compositions tested and recorded in Table I were shaped into a form adapted for the formation of tensile specimens in accordance with the procedure set forth in section 14 of the sixth edition of The Foundry Sand Handbook published in 1952 by The American Foundrymen's Society. The specimens formed were of general "dumbbell" configuration having a length of about three inches, a thickness of one inch, and a narrow central neck portion one inch in width providing a central portion one square inch in cross section.

The foundry composition tested was composed of 2,000 parts of sand, 16 parts by weight of 25 percent sulfuric acid and 40 parts by weight of a resinous binder containing formaldehyde and furfuryl alcohol in a molar ratio of one to four respectively. This composition had a work life of about two hours. Thermocouples embedded in the sides of the test specimens opposite to those from which the air entered the specimens recorded the temperatures set forth below at the time intervals indicated.

TABLE I

| Time (seconds) | Air temperature | |
| --- | --- | --- |
| | 66° C. | 86° C. |
| 0 | 25 | 25 |
| 15 | | 21 |
| 30 | 25 | 22 |
| 45 | | 26 |
| 60 | 25 | 49 |
| 75 | | 51 |
| 90 | 27 | 53 |
| 105 | | 55 |
| 120 | 29 | 57 |
| 150 | 34 | |

It will be noted from Table I that the air stream heated to 66° C. did not elevate the temperature of the test specimen above the room temperature of approximately 25° C. until after ninety seconds of air passage. The 86° C. air stream initially lowered the specimen temperature, presumably because of the more rapid evaporation which was not effected with the 66° C. stream, and the specimen did not exceed room temperature until after the expiration of about forty-five seconds. The initial periods of ninety and forty-five seconds were adequate to remove the aqueous catalyst diluent of the two specimens. Normally the shaped foundry test specimens are of sufficient green hardness (80–90) at this stage to remove from the form and terminate curing under room conditions in a relatively short period of time (up to three hours). All hardnesses of green uncured specimens herein referred to were measured by means of a Dietert green hardness tester; scratch hardnesses of cured specimens were measured by means of a Dietert scratch hardness tester.

The following Example I discloses the rapid hardening of a composition processed in accordance with the steps of this invention.

*Example 1*

Sand particles were intimately mixed with an aqueous 25 percent sulfuric acid catalyst solution. The resulting composition was mixed with an acid-curable, thermosetting resin binder utilizing formaldehyde and furfuryl alcohol in a molar ratio of one to four, respectively. The binder was present in the amount of 2 percent by weight of the sand, and the catalyst solution was present in the amount of 40 percent by weight of the binder. The resulting composition had a work life of two hours. After being subjected to passage of an air stream maintained at a temperature of 66° C. for one minute, followed by a ten minute cure at room temperature, a specimen possessed a tensile strength of 190 pounds per square inch. Extension of the room temperature cure to two hours, of a specimen subjected to 66° C. air for one minute, provided a specimen tensile strength of 246 pounds per square inch.

Other tensile specimens made from the foregoing composition possessed an internal scratch hardness of 80 at the center of the neck of one square inch cross section, and a surface scratch hardness of 90 after passage of the 66° C. air therethrough for one minute and subsequent room temperature cure for two hours. At the end of 66° C. air passage of seventy-five seconds, and subsequent curing at room temperature for two hours, the scratch hardnesses were 80 and 97, respectively, and at the end of 66° C. air passage of ninety seconds and a subsequent two hour room cure, the scratch hardnesses were 83 and 98, respectively. Passage of room temperature air through a test specimen for about five minutes provided an external hardness which was in excess of an internal scratch hardness of over 80.

The foregoing scratch hardnesses indicate a greater surface hardness than internal hardness after the specimen has been cured. Such hardness relationship is obviously desirable since the exterior surface is that which engages and forms the molten metal in the normal casting operation. Scratch hardnesses of 80–90 are completely satisfactory for forming molten metals most commonly employed in casting operations. References herein to specimens of "satisfactory hardness" refer to a scratch hardness within the 80–90 range or above.

The hardnesses of Example I are to be compared with internal and external hardnesses of shaped foundry mixes which are oven-cured. Curing processes employing ovens necessitate a progressive hardening of shaped foundry mixes from the outside surface to the innermost portion. In order to assure proper curing and resulting desired strength in the innermost portion of the shaped composition, oven curing of shaped foundry compositions generally results in overcuring of the outer surface and resulting loss of surface hardness. The loss in surface hardness becomes greater as the sand mixture increases in thickness since more cure time is necessary to assure heat penetration to the center of the mixture, as evidenced by the following example.

*Example II*

A foundry sand composition employing a conventional oil-cereal binder, well known to the art, was rammed into a tensile-specimen form and baked at 425° F. for one hour. The resulting cured composition had an average internal hardness of 93 and an average surface hardness of 84, indicating loss in surface hardness as a result of overcuring in the course of carrying out a normal curing process to insure adequate hardening of the center. The process of this invention assures desired hardening throughout the cross section of the shaped foundry composition without any danger of surface overcuring.

If the composition of a shell mold were merely allowed to remain exposed to normal room atmosphere for purposes of removing the catalyst diluent, that diluent on the surface of the shell would evaporate forming a hard crust sealing the remaining diluent within the center of the shell. Thus, only a crust portion of the shell mold would cure and possess a soft center having little or no strength.

The following additional examples are illustrative of the variety of compositions which may be employed in practicing the process of this invention. All parts referred to in the compositions of the following examples are by weight. The gas streams of Examples III through V employed for purposes of removing acid diluents were at room temperature. In Examples I, II, and VI through XV, the specimens employed were tensile specimens made as above described in accordance with section 14 of The Foundry Sand Handbook. The heated air streams passed through the specimens in the latter examples (with the exception of Example II), were formed from air having 60 percent relative humidity at room temperature (25° C.). The compositions of the following examples were able to form specimens of satisfactory hardness within five minutes utilizing the heated air streams indicated, or provide specimens in which the catalyst solution moisture was removable within two minutes and cure to satisfactory hardness subsequently effected within two to three hours at room temperature.

*Example III*

One hundred parts of sand were intimately mixed with four parts of a 25 percent aqueous solution of sulfuric acid. The resulting mixture was then uniformly mixed with five parts of furfuryl alcohol. The final molding composition was somewhat tacky and partially cured at room temperature in three hours. A ¼ inch sample was placed in a Buchner funnel and air pulled through it. The sample cured in five minutes. Other samples were placed in a desiccator to which a vacuum was applied; these samples cured in thirty minutes.

*Example IV*

One hundred parts of sand were mixed with two parts of a 25 percent aqueous solution of sulfuric acid and five parts of furfuryl alcohol in the manner described in Example III. The resulting mix had a work life, or storage life, at room temperature, of several hours. A portion of the sample, when placed in the form of a ⅜ inch layer in a Buchner funnel through which air was pulled, cured hard in twenty minutes.

*Example V*

One hundred parts of sand were mixed intimately with four parts of a 50 percent aqueous solution of phosphoric acid and five parts of furfuryl alcohol in the manner described in Example III. The resulting mix was stable several hours at room temperature. Samples of the mix cured in a desiccator under vacuum in thirty minutes. Samples of the mix through which air was pulled cured in a Buchner funnel in an hour.

In the following examples, in which heated gaseous streams are passed through molded tensile specimens, the aqueous diluent in the composition is able to be removed in two minutes or less. At the end of this short period the composition may be removed from the form or pattern and allowed to cure to a satisfactory hardness at a room temperature of approximately 25–27° C. in two to three hours. In the following examples, passages of gaseous streams heated to the temperatures indicated through the molded tensile specimens resulted in complete curing of the specimens to satisfactory hardness in five minutes or less.

It is seen, therefore, that in accordance with the process of this invention, heated or room-temperature gaseous streams may be employed for purposes of removing an aqueous diluent. At the moment of diluent exhaustion, the composition temperature itself has not yet exceeded room temperature; at this stage the composition may be removed from the pattern surface to complete curing at room temperature in about two to three hours. The process steps of this invention may also be employed to rapidly and completely cure shaped test specimens to a satisfactory hardness by means of gaseous streams maintained at elevated temperatures in a few minutes. At the end of the cure, the specimens will possess hardened outer surfaces which have not lessened in hardness in the course of curing as a result overcuring. Thus, if a complete cure of a shaped foundry core or mold is desired in a minimum amount of time, the shaped mass is completely cured in a single processing step by means of a heated gaseous stream. If time is not of great importance, the shaped foundry mass may terminate curing at room temperature after the moisture of the catalyst solution has been removed by a gaseous stream which may be heated or at room temperature.

*Example VI*

One hundred parts of sand were coated with an aqueous 25 percent sulfuric acid catalyst solution and subsequently mixed with a resinous binder utilizing formaldehyde and furfuryl alcohol in a molar ratio of one to four, respectively. The resin was present in the amount of two parts by weight, and the acidic catalyst solution was present in the amount of 60 percent by weight of the acid-curable resin. The resulting mixture had a work life of two hours and provided a mix pH of 2.20. The aqueous catalyst diluent was substantially completely removed from the composition within two minutes when the latter was subjected to an air stream passing therethrough maintained at a temperature of 66° C.; the composition was cured to a satisfactory hardness within five minutes upon being subjected to the 66° C. air.

*Example VII*

One hundred parts of sand were coated with a 20 percent aqueous phosphoric acid solution and the resulting mixture combined with two parts of a furfurylated-urea resin containing forty parts of furfuryl alcohol per one hundred parts total resin composition. The acidic catalyst solution was present in the amount of 20 percent by weight of the thermosetting binder. The resulting composition had a work life of four hours. Test specimens subjected to a heated air stream maintained at a temperature of about 66° C. removed substantially all of the moisture from the composition in two minutes, whereafter the specimens were of sufficient hardness to be removed from the molds and cured to a satisfactory hardness at room temperature in about three hours. The composition of Example VII had a mix pH of 4.5.

Increasing the amount of catalyst in the composition of Example VII to 40 percent by weight of the binder resulted in a composition having a work life of three hours and a mix pH of 4. The latter composition cured more rapidly because of the increased catalyst activity.

Increase in the catalyst amount in the composition of Example VII to 60 percent by weight of the resinous binder decreased the mix pH to 3.6 and provided a composition which cured more rapidly to satisfactory hardnesses than the above-described similar compositions containing lesser amounts of catalyst.

*Example VIII*

Particles of sand were mixed with an aqueous 25 percent sulfuric acid catalyst solution and a resinous binder of formaldehyde and furfuryl alcohol in a molar ratio of one to four, respectively. The binder was present in the amount of 2 percent by weight of the sand and the aqueous catalyst solution was present in the amount of 40 percent by weight of the thermosetting binder. The resulting composition had a work life of two hours, and test specimens, when subjected to passage of an 86° C. air steam for forty-five seconds and a subsequent room temperature cure of two hours possessed a tensile strength of 365 pounds per square inch; a tensile strength of 371 pounds per square inch at the end of a one minute 86° C. air passage and subsequent room cure of two hours; and a tensile strength of 400 pounds per square inch at the end of a two minute 86° C. air passage and subsequent room cure of two hours. The composition of Example VIII had a mix pH of 2.75.

*Example IX*

A composition similar to that of Example VIII, with the exception that the catalyst was present in the amount of 25 percent by weight of the binder, and the further exception that the sulfuric acid in the catalyst solution was diluted with methyl alcohol as well as water, was formed into specimens. When subjected to heated air stream passing therethrough of 78° C., the test specimens possessed the following tensile strengths: at the end of a forty second 78° C. air passage and a subsequent room cure of two hours, 270 pounds per square inch; at the end of a forty-five second 78° C. air passage and subsequent room temperature cure of two hours, 325 pounds per square inch; and at the end of a one minute 78° C. air passage and subsequent room temperature of two hours, 322 pounds per square inch. The foundry sand composition of Example IX had a work life of one hour and a mix pH of 3.25.

It will be noted that the composition of Example IX possessed a reduced work life despite the reduced acid concentration when compared to the composition of Example VIII, thereby indicating that the methyl alcohol was ineffective as a diluent in preventing hardening of the polymerizable binder in one acid catalyst solution.

*Example X*

Particles of sand were mixed with an aqueous 33 percent maleic acid catalyst solution and a resin binder containing formaldehyde and furfuryl alcohol in a molar ratio of one to four, respectively. The resinous binder was present in the amount of 2 percent by weight of the sand and the catalyst solution was present in the amount of 40 percent by weight of the polymerizable binder. The resultant composition was placed in tensile specimen molds and subjected to passage of an air stream at a temperature of 70–72° C. The specimens had substantially all of the moisture removed therefrom at the end of a two minute exposure, whereafter they were able to cure to satisfactory hardness at room temperature in less than three hours. The initial foundry composition had a work life of two and one-half hours and a mix pH of 3.25.

*Example XI*

Particles of sand were mixed with an aqueous 50 percent trichloroacetic acid catalyst solution and a polymerizable binder containing one mol of formaldehyde per four mols of furfuryl alcohol. The binder was present in the amount of 2 percent by weight of the sand and the acid catalyst solution was present in the amount of 25 percent by weight of the binder. Specimens formed from the resultant composition, when subjected to an air stream at a temperature of 71° C., completely cured in five minutes to a satisfactory hardness. The foundry composition of Example XI had a work life of three hours and a mix pH of 4.

Increasing the amount of the 50 percent trichloroacetic acid catalyst solution to 40 percent by weight of the resinous binder provided a composition having substantially the same work life of three hours, but reduced the mix pH to 3.5. Specimens of satisfactory hardness were formed by passing an air stream heated to 75° C. through specimens for a period of less than five minutes.

*Example XII*

Particles of sand were mixed with an aqueous 25 percent sulfuric acid solution and a resinous binder containing furfuryl alcohol and formaldehyde in a four to one molar ratio. The thermosetting binder was present in the amount of 2 percent by weight of the sand and the catalyst solution was present in the amount of 40 percent by weight of the binder. Specimens formed from the latter composition, when subjected to a stream of nitrogen at a temperature of 60° C. for one minute, followed by a room temperature cure of two hours, possessed a tensile strength of 318 pounds per square inch. The composition of Example XII had a work life of two hours and a mix pH of 2.7.

*Example XIII*

Particles of sand were mixed with an aqueous 50 percent ferric chloride catalyst solution and a resinous binder containing formaldehyde and furfuryl alcohol in a one to four molar ratio. The binder was present in the amount of 2 percent by weight of the sand and the catalyst was present in the amount of 20 percent by weight of the binder. The resultant composition had a work life of three hours and a mix pH of 3.6. The specimens formed from the composition of Example XIII cured to satisfactory hardness within five minutes when subjected to an air stream heated to 66° C. Other specimens had moisture substantially completely removed therefrom within two minutes, whereafter the specimens cured to satisfactory hardness at room temperature in from two to three hours.

Increasing the amount of 50 percent aqueous ferric chloride catalyst solution to 40 percent by weight of the binder reduced the work life to two and one-half hours. The latter composition provided a mix pH of 3.2. Specimens formed therefrom cured to satisfactory hardness in shorter times than the 20 percent by weight composition because of the greater catalyst activity.

*Example XIV*

Particles of sand were mixed with an aqueous 25 percent sulfuric acid catalyst solution and a furfuryl alcohol-phenol-formaldehyde resin binder in which the furfuryl alcohol was present in the amount of 40 percent by weight of the binder and the formaldehyde was present in the ratio of two and one-half mols per mol of phenol. The binder was present in the amount of 2 percent by weight of the sand and the catalyst solution was present in the amount of 40 percent by weight of the resinous binder. The resultant composition was packed into test specimen molds and subjected to an air stream which was passed therethrough and heated to a temperature of 69° C. After an air passage of one minute and a subsequent room temperature cure of two hours, the specimens attained a tensile strength of 200 pounds per square inch. The composition of Example XIV had a work life of three hours and a mix pH of 2.75.

*Example XV*

Particles of sand were mixed with an aqueous 20 percent phosphoric acid catalyst solution. The resulting mixture was combined with the polymerizable binder comprising a urea-formaldehyde resin in which the urea was present in the ratio of one mol per two mols of formaldehyde. The binder was present in the amount of 2 percent by weight of the sand and the aqueous phosphoric acid catalyst solution was present in the amount of 50 percent by weight of the resin. The composition of Example XV had a work life of three hours and a mix pH of 3.8. Tensile specimens formed from the composition of Example XV were subjected to a heated air stream maintained at a temperature of 69° C. for one minute and cured at room temperature for two hours. These specimens had a surface hardness of 70. At the end of a one and one-half minute 69° C. air passage and room cure of less than three hours, tensile specimens possessed a surface hardness of 75. Satisfactory scratch hardnesses were obtained within five minutes utilizing the 69° C. air stream.

As seen from the foregoing examples, a large number of foundry sand compositions employing various thermosetting polymerizable binders may be employed with dilute aqueous acid catalyst solutions in a process whereby the water in the catalyst solution is evaporated until the acid is of sufficient concentration to trigger polymerization of the polymerizable binder. The catalyst should be present in sufficient quantity to trigger polymerization of the binder and the binder should be present in sufficient quantity to effect desired assembly of the sand grains into shell or core formation.

Inasmuch as the specific polymerizable binder may vary, the quantity of aqueous acid catalyst necessary to polymerize the same will also vary, such variance being caused by varying alkalinity values of the sand and acid values necessary for polymerization of the binder. Normally the polymerizable binder should be present in the amount of one to six parts by weight of the sand; as above pointed out, the quantity of binder is dependent up the fineness of the sand. The amount of the acid catalyst, as also above noted, cannot be stated with exactness. The sand employed in Examples I, II, and VI through XV, had as AFS (American Foundrymen's Society) fineness of 50 to 55; the sand of Examples III through V was a silica sand having an AFS fineness of 75.

It is obvious that the specific nature of the refractory material employed is not of any great significance and the inventive process steps above disclosed may be utilized to advantage by the skilled artisan regardless of the specific polymerizable binder and catalyst selected. The catalyst employed should preferably provide a mix pH of about 2.2 to 2.75 when ten grams of the complete foundry sand mix are slurried with 50 cc. of neutral distilled water. However, acid catalysts which provide foundry sand compositions which effect a pH within the range of about 2 to 4.5 are workable for purposes of carrying out the above-described process. In the appended claims "mix pH" shall refer to a pH determined in the manner above described and hardness numbers shall be those hardnesses as determined by Dietert hardness testers.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:
1. A process comprising forming a molding composition curable at room temperature by mixing together sand, an aqueous acid solution, and an acid-curable, polymerizable binder; said binder being present in sufficient quantity to bind said sand particles together when cured; the acid in said aqueous acid solution being present in sufficient quantity but insufficient concentration to cause curing of said binder at room temperature, forming said molding composition into desired shape, and increasing the concentration of acid in said aqueous acid solution of the shaped composition at substantially room temperature by removing water therein in a substantially uniform manner at least until said acid is present in sufficient concentration to commence rapid curing of said binder.

2. A process comprising forming a molding composition curable at room temperature by mixing together one hundred parts of sand and a dilute aqueous acid solution, the resulting sand-acid solution mixture being mixed with one to six parts by weight, based on the weight of the sand, of an acid-curable, polymerizable binder; the acid in said aqueous acid solution being so dilute as to be incapable of curing said binder at room temperature; said acid being present in sufficient quantity to cause curing of said binder upon removal of at least some of the water in said aqueous acid solution; forming said molding composition into desired shape, and rapidly removing water from said aqueous acid solution of the shaped composition at substantially room temperature in a substantially uniform manner.

3. A process comprising forming a molding composition curable at room temperature by mixing together sand, an aqueous acid solution, and an acid-curable, polymerizable binder; said binder being present in sufficient quantity to bind said sand particles together when cured; the acid in said aqueous acid solution being present in sufficient quantity but insufficient concentration to cause curing of said binder at room temperature; forming said molding composition into a desired shape, and increasing the concentration of acid in said aqueous acid solution by removing water therein in a substantially uniform manner from all portions of the shaped molding composition without raising the temperature of said molding composition above room temperature.

4. The process of claim 3 in which said water is removed by flowing a non-reactive gaseous medium through the shaped composition.

5. The process of claim 3 in which said molding composition has a mix pH or within the range of about 2–4.5.

6. A process comprising forming a molding composition curable at room temperature by mixing together sand, an aqueous acid solution, and an acid-curable, polymerizable binder; said binder being present in sufficient quantity to bind said sand particles together when cured; the acid in said acid solution being of sufficient quantity but insufficient concentration to cause curing of said binder at room temperature; forming the resulting mixture into a desired shape; and curing the binder in said resulting mixture at substantially room temperature by passing an inert gaseous stream therethrough until said mixture has an internal scratch hardness of at least about 80.

7. A process comprising forming a molding composition curable at room temperature by mixing together sand, an aqueous acid solution, and an acid-curable, polymerizable binder; said binder being present in sufficent quantity to bind said sand particles together when cured; the acid in said aqueous acid solution being present in sufficient quantity but insufficient concentration to cause curing of said resin at room temperature; forming said molding composition into desired shape, and blowing air through the shaped molding composition maintained at room temperature for purposes of removing the water from said aqueous acid solution.

8. A process comprising forming a molding composition curable at room temperature by mixing together one hundred parts of sand, an aqueous acid solution, and between about one to six parts, based on the weight of the sand, of an acid-curable, polymerizable binder; the acid in said acid solution being present in sufficient quantity but insufficient concentration to cause curing of said binder at room temperature; forming said molding composition into a desired shape, and rapidly removing the water in said acid solution in a substantially uniform manner from all portions of said molding composition without raising the temperature of said composition above room temperature until the acid concentration in said acid solution increases to such an extent that it is enabled to effect rapid curing of said binder component.

9. A process comprising forming a molding composition curable at room temperature by mixing together one hundred parts of sand, an aqueous acid solution, and between about one to six parts, based on the weight of sand, of an acid-curable, polymerizable binder; said acid solution containing a sufficient quantity of water to prevent immediate polymerization of said binder at room temperature; forming the resulting mixture into a desired shape and removing the water in the resulting mixture at substantially room temperature by blowing air therethrough until the acid concentration in said acid solution in said mixture increases to such an extent that it is enabled to effect polymerization of said binder component.

10. The process of claim 9 in which the acid in said aqueous acid solution is sulfuric, and said polymerizable binder component is a furfuryl alcohol-formaldehyde resin.

11. A process comprising forming a molding composition curable at room temperature by mixing together one hundred parts of sand, an aqueous acid solution, and between about one to six parts, based on the weight of the sand, of an acid-curable, polymerizable binder; the acid in said acid solution being of sufficient quantity but insufficient concentration to cause curing of said binder at room temperature; forming the resulting mixture into a desired shape; increasing the concentration of acid in the shaped mixture by removing the water therein in a substantially uniform manner from all portions thereof at substantially room temperature by passing a heated inert gaseous stream maintained at a temperature of at least about 60° C. until an internal green hardness of at least 80 is obtained; and allowing said shaped mixture to cure at room temperature for two to three hours.

12. A process comprising forming a molding composition curable at room temperature by mixing together one hundred parts of sand, an aqueous acid solution, and between about one to six parts, based on the weight of the sand, of an acid-curable, polymerizable binder; the acid in said acid solution being of sufficient quantity but insufficient concentration to cause curing of said binder at room temperature; forming the resulting mixture into a desired shape; and curing the binder at substantially room temperature in said resulting mixture by passing an inert gaseous stream maintained at a temperature of at least 60° C. for no longer than about five minutes through the resulting mix.

13. A process comprising forming a molding composition curable at room temperature by mixing together one hundred parts of sand, an aqueous acid solution, and between about one to six parts, based on the weight of the sand, of an acid-curable, polymerizable binder; the acid in said aqueous acid solution being inadequate in concentration to cause curing of said binder at room temperature and providing a mixture having a mix pH of between about 2 to 4.5; forming said resulting mixture into a desired shape over a pattern surface; increasing the concentration of acid in the shaped mixture at substantially room temperature by removing the water therein by passing a heated gaseous stream therethrough; removing the shaped mixture from the pattern surface, and allowing said shaped mixture to terminate curing at room temperature.

References Cited in the file of this patent

UNITED STATES PATENTS

| | | |
|---|---|---|
| 2,471,600 | Adams | May 31, 1949 |
| 3,024,215 | Freeman et al. | Mar. 6, 1962 |
| 3,059,297 | Dunn et al. | Oct. 23, 1962 |

FOREIGN PATENTS

| | | |
|---|---|---|
| 573,760 | Canada | Apr. 7, 1959 |